(12) United States Patent
Goto (10) Patent No.: US 10,023,029 B2
(45) Date of Patent: Jul. 17, 2018

(54) VEHICLE DOOR

(71) Applicant: HONDA MOTOR CO., LTD., Tokyo (JP)

(72) Inventor: Joji Goto, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 121 days.

(21) Appl. No.: 14/424,506

(22) PCT Filed: Jun. 7, 2013

(86) PCT No.: PCT/JP2013/065808
§ 371 (c)(1),
(2) Date: Feb. 27, 2015

(87) PCT Pub. No.: WO2014/034219
PCT Pub. Date: Mar. 6, 2014

(65) Prior Publication Data
US 2015/0251524 A1    Sep. 10, 2015

(30) Foreign Application Priority Data
Aug. 31, 2012 (JP) ................. 2012-191029

(51) Int. Cl.
*B60J 5/04* (2006.01)
*B60J 10/70* (2016.01)

(52) U.S. Cl.
CPC ........... *B60J 5/0402* (2013.01); *B60J 5/0426* (2013.01); *B60J 10/70* (2016.02)

(58) Field of Classification Search
CPC ........ B60J 10/02; B60J 5/0402; B60J 5/0426; B60J 5/0411

(Continued)

(56) References Cited

U.S. PATENT DOCUMENTS 2,946,622 A * 7/1960 Abbott ................... B60J 5/0402
49/166
2005/0223648 A1* 10/2005 Takeuchi ............... B60J 5/0402
49/502

(Continued)

FOREIGN PATENT DOCUMENTS

EP     2 289 721    *  3/2011
JP      2601884        10/1999

(Continued)

OTHER PUBLICATIONS

JP200246534 translation.*
International Search Report, dated Aug. 13, 2013 (Aug. 13, 2013).

*Primary Examiner* — Gregory J Strimbu
(74) *Attorney, Agent, or Firm* — Rankin, Hill & Clark LLP (57) ABSTRACT

A vehicle door (10) has a door main body (20) comprising an inner panel (21) and an outer panel (22); a door sash (40) at the top of the door main body (20); a window opening section (14); a window panel (17) that occludes at least a portion of the window opening section (14); a panel support frame (50) that supports at least a portion of the window panel (17); and a belt line reinforcing member (100) attached to the inner panel (21) or the outer panel (22) along an upper edge of the door main body (20). The belt line reinforcing member (100) has an upper extension section (102) extending along the door sash (40) above the upper edge of the door main body (20), and the panel support frame (50) is sandwiched between the door sash (40) and the upper extension section (102).

7 Claims, 8 Drawing Sheets (58) Field of Classification Search
USPC .................................. 49/374, 377, 502, 506
See application file for complete search history.

(56) References Cited

U.S. PATENT DOCUMENTS

| | | | |
|---|---|---|---|
| 2006/0156632 A1* | 7/2006 | Ruppert | B29C 45/14377 |
| | | | 49/502 |
| 2009/0064594 A1* | 3/2009 | Kimoto | B60J 1/10 |
| | | | 49/489.1 |
| 2011/0302846 A1* | 12/2011 | Okada | B60J 5/0408 |
| | | | 49/502 |
| 2015/0183306 A1* | 7/2015 | Shimizu | B60J 5/0411 |
| | | | 296/146.6 |

FOREIGN PATENT DOCUMENTS

| | | |
|---|---|---|
| JP | 2002-046471 | 2/2002 |
| JP | 2002-046534 | 2/2002 |
| JP | 2003-025852 | 1/2003 |
| JP | 2007-223406 | 9/2007 |
| JP | 2008-201304 | 9/2008 |
| JP | 4729087 | 4/2011 |
| JP | 2012-011941 | 1/2012 |

\* cited by examiner

VEHICLE DOOR

TECHNICAL FIELD

The present invention relates to an improvement in a vehicle door.

BACKGROUND ART

In recent years, endeavors are going on to develop vehicles each having a rear door with a stationary window panel provided in a rear part of a door sash (see Patent Literature 1, Japanese Patent No. 4729087, for example).

The vehicle door disclosed in Patent Literature 1 is comprised of a door body and a door sash provided at an upper part of the door body. A stationary window panel and a garnish are mounted to the door sash.

Specifically, the door sash is provided with a recessed part for fitting the stationary window panel therein. Peripheral edge of the stationary window panel is fitted in the recessed part via a panel support member having sealing capability.

Part of the door sash is formed from two press-shaped panels laid one over the other and joined together. To increase the rigidity of the door sash, one may propose to join the two panels together in such a manner as to provide a closed cross section. However, mere provision of a recessed part to the closed cross section leads to complexity of the cross sectional construction.

On the other hand, for providing a recessed part to the cross section without rendering the cross section complex, one may come to think of adopting an additional member for forming the recessed part. However, adoption of the additional member leads to increase in the number of parts and is undesirable in terms of light-weighing of the end product. Further, the additional member leads to increase in the cost of manufacture.

SUMMARY OF INVENTION

Technical Problems

It is an object of the present invention to provide a technique that enables reduction in the cost of production of a vehicle door having a window panel.

Solution to Problem

According to an aspect of the present invention, there is provided a vehicle door comprising: a door body having an inner panel and an outer panel; a door sash provided to an upper part of the door body; a window opening surrounded by the door sash and an upper edge of the door body; a window panel blocking at least part of the window opening; a panel support frame supporting at least part of a peripheral edge of the window panel; and a belt line reinforcing member mounted to one of the inner panel and the outer panel so as to extend along an upper edge of the door body, wherein the beltline reinforcing member includes an upper extension part extending along the door sash further upward than the upper edge of the door body, and the panel support frame is sandwiched between the door sash and the upper extension part.

Preferably, the vehicle door further comprises a garnish covering an external surface of the door sash, wherein the upper extension part has an external surface covered with the garnish.

It is preferred that the door sash have a recessed part on the surface covered with the garnish, the recessed part being recessed in a direction away from a back surface of the garnish, and the upper extension part be provided in the recessed part.

It is desired that the upper extension part have an upper end positioned at a vertically intermediate position of the door sash and the garnish be held in contact with the panel support frame at a portion above the upper end of the upper extension part.

In a preferred form, the upper extension part has an opposed-to-frame surface opposed to the panel support frame, and the opposed-to-frame surface is positioned flush with the opposed-to-frame surface, opposed to the panel support frame, of the garnish.

Desirably, the beltline reinforcing member has a first bead extending along the upper edge of the door body while the upper extension part has a second bead extending along the door sash, the second bead being continuous from the first bead.

Advantageous Effects of Invention

According to the present invention, the panel support frame is held in a sandwiched fashion between the door sash and the upper extension part of the beltline reinforcing member. Namely, the window panel is supported through utilization of the beltline reinforcing member. It thus becomes unnecessary to make the configuration of the door sash complex for supporting the window panel or to increase the number of required parts. By thus avoiding increase in the required processes and parts, it becomes possible to reduce the cost of production of and the weight of the vehicle door.

In addition, the beltline reinforcing member extending along the upper edge of the door body has the upper extension part that that extends further upward than the upper edge of the door body. Namely, the upper extension part extends from the upper edge of the door body along the door sash. This causes the upper extension part to prevent falling of the door sash by an external force applied to the door sash in a direction of falling of the latter. Consequently, the vehicle door is imparted with increased rigidity.

In one form, the external surface of the upper extension part is covered with the garnish. With the upper extension part covered with the garnish, a good external appearance is obtained.

In another form, the door sash has a recessed part on its surface covered with the garnish, the recessed part being recessed in a direction away from the back surface of the garnish, while the upper extension part is accommodated in the recessed part. With the upper extension part accommodated in the recessed part, the garnish can be positioned more closely to the door sash. With the garnish positioned more closely to the door sash, it becomes possible to reduce the thickness of the door sash.

In a further form, the garnish is held in contact with the panel support frame at its portion further upward than the upper end of the upper extension part. By this contact arrangement, movement of the panel support frame in its thickness direction can be prevented. While shortening the upper extension part, support of the panel support frame in its entirety is enabled.

In a still further form, the upper extension part has an opposed-to-frame surface opposed to the panel support frame, and the opposed-to-frame surface is positioned flush with the opposed-to-frame surface, opposed to the panel support frame, of the garnish. When those surfaces 72, 102b are assumed to have unevenness, it becomes necessary to shape the panel support frame so as to mitigate or cope with the unevenness. In accordance with the present invention, with the surfaces 72, 102b rendered flush with each other, it is unnecessary to modify the configuration of the panel support frame. As a result, the panel support frame is rendered simple in configuration. The panel support frame rendered simple in configuration can be manufactured easily, with the result that the vehicle door 10 can be manufactured at a reduced cost In a still further form, the beltline reinforcing member has a first bead extending along the upper edge of the door body while the upper extension part has a second bead extending along the door sash, the first and second beads being continuous. The first and second bead being continuous enable increase in the overall rigidity of the beltline reinforcing member. Additionally, falling of the door sash can be surely prevented.

MODE FOR CARRYING OUT INVENTION

Hereinafter, referring to the accompanying drawings, detailed description will be made as to a preferred embodiment of the present invention. Throughout the description hereof, the term "left and right" represents left and right directions as a vehicle passenger is taken as a reference. Similarly, the term "front and rear" represents front and rear directions as a travel direction of the vehicle is taken as a reference. In the drawings, reference characters "Fr", "Rr", "Out", "In", "Up" and "Dw" respectively represent frontward, rearward, vehicle outside, vehicle inside, upward and downward.

Embodiment

Figure 1:
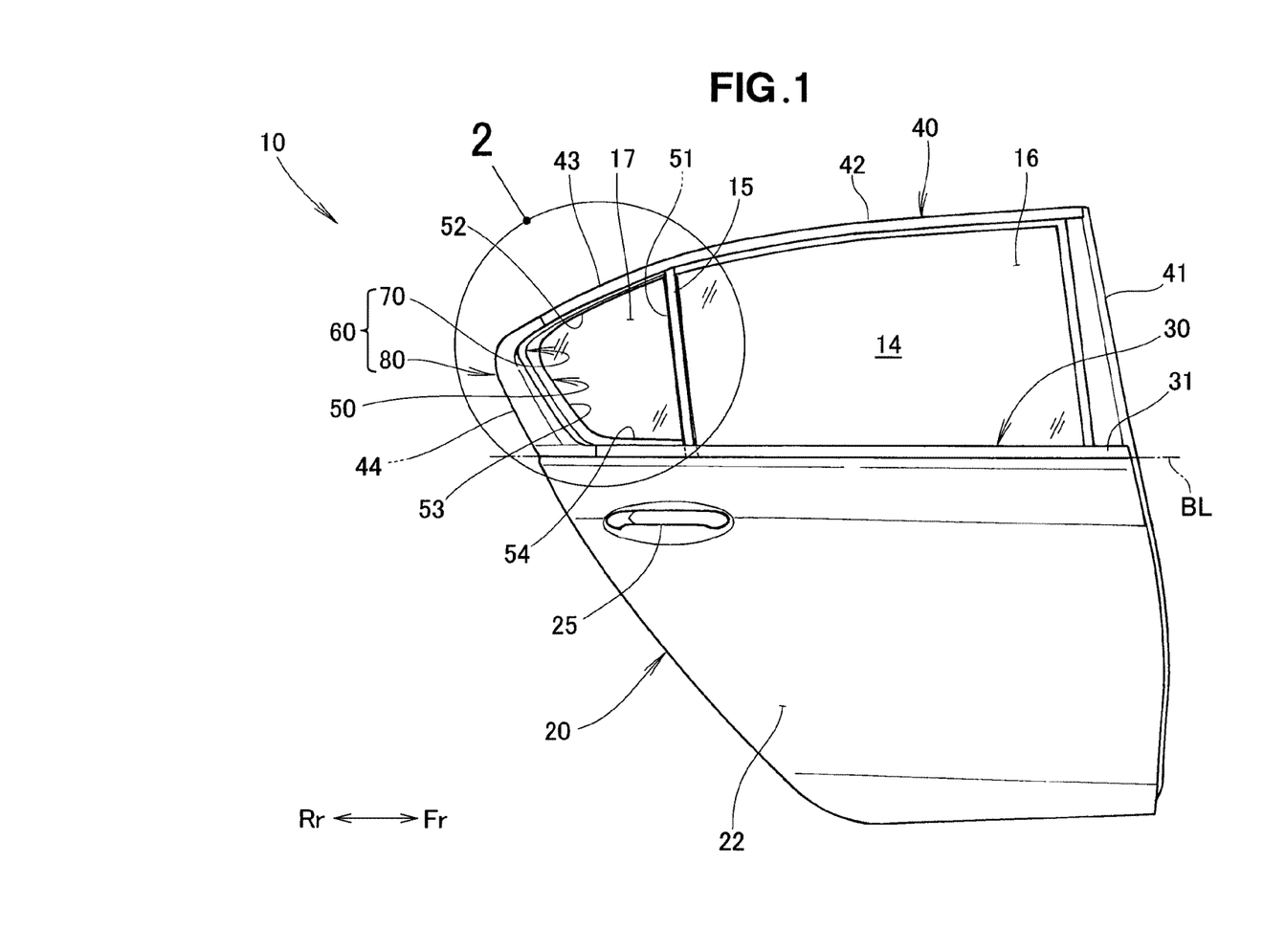
FIG. 1 is a view illustrating a vehicle door, as seen from outside a vehicle, according to the present invention.
Figure 2:
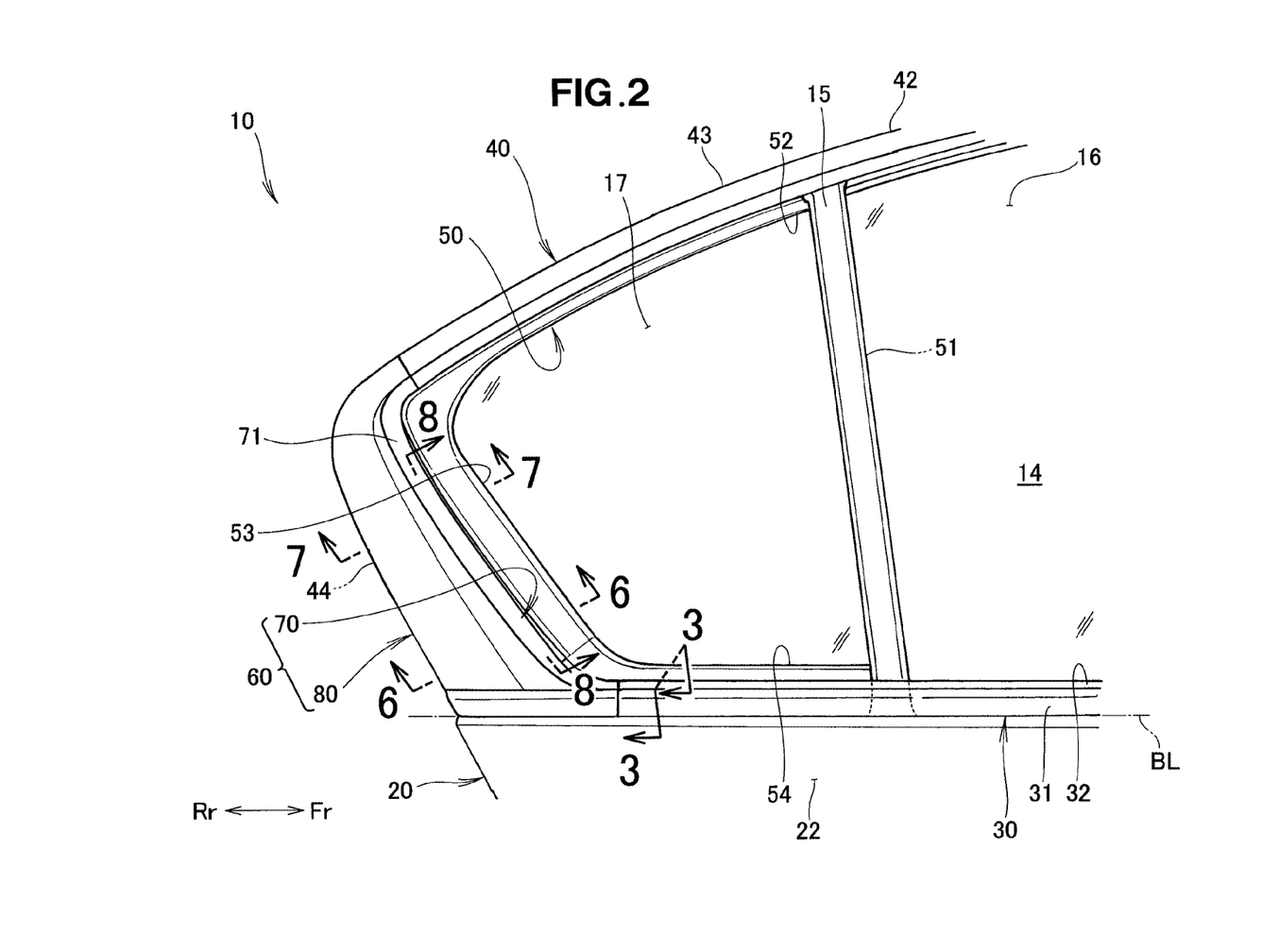
FIG. 2 is a view illustrating, on an enlarge scale, an encircled region 2 of FIG. 1.

Vehicle door 10 shown in FIGS. 1 and 2 is exemplified as a door for a rear part of a vehicle. The vehicle door 10 is comprised of; a door body 20 mounted openably/closably to an opening formed in a rear part of the vehicle; a beltline molding 30 mounted to extend along an upper edge of the door body 20; a door sash 40 provided on a upper part of the beltline molding 30; an auxiliary sash 15 halving a window opening 14 defined by the door sash 40 and the door body 20; a window panel 16 made of glass and mounted vertically movable to a front part of the auxiliary sash 15; a panel support frame 50 mounted to a region surrounded by a rear part of the auxiliary sash 15 and the door sash 40; a glass-made, stationary window panel 17 (window panel 17) mounted at an outer periphery thereof to the panel support frame 50; and a molding-equipped garnish 60 mounted to a front surface of the door sash 40 at a rear part of the stationary window panel 17.

Beltline BL represents a line extending along an upper edge of the door body 20 or a line extending along a lower edge of the door sash 40. Namely, the beltline molding 30 is an ornamental member that extends along the beltline BL. The beltline molding is mounted to the door body 20.

Figure 3:
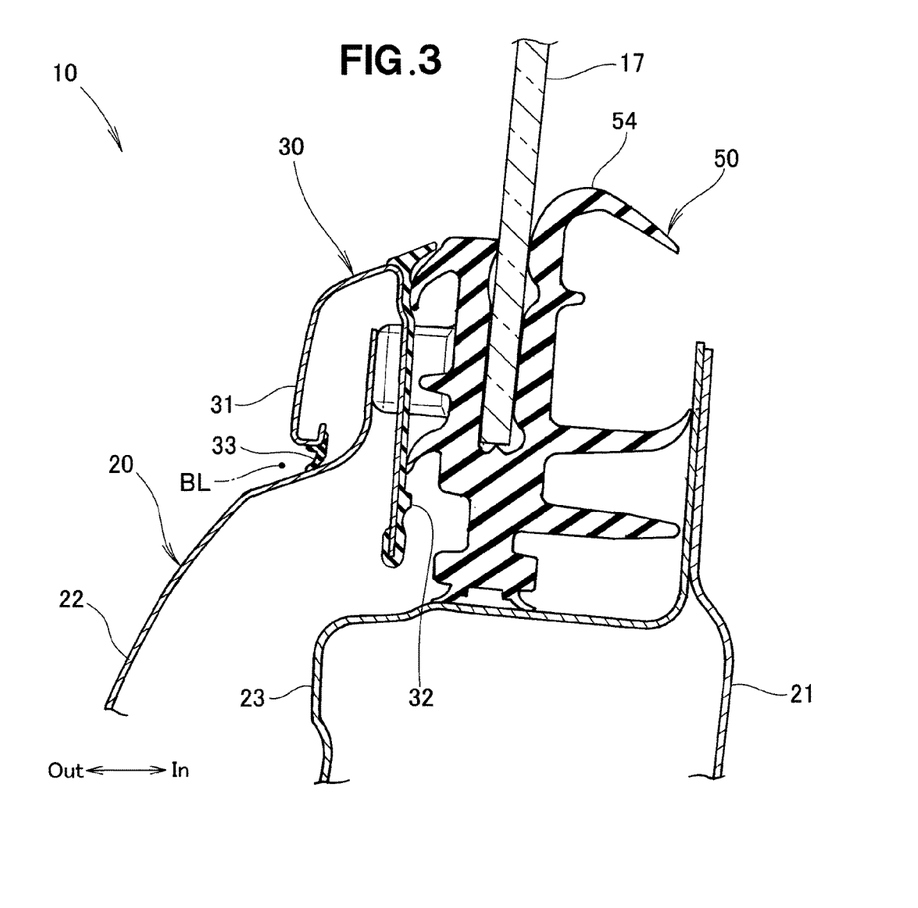
FIG. 3 is a cross-sectional view take along line 3-3 of FIG. 2.

Referring also to FIG. 3, the door body 20 is comprised of an inner panel 21 positioned internally of a passenger compartment; an outer panel 22 serving as a vehicle outside design surface; and a stiffener 23 laid, for reinforcement, on a vehicle-exterior side of the inner panel 21. As shown in FIG. 1, a door knob 25 is disposed on a rear part of the outer panel 22 for allowing a passenger to swing-open the vehicle door 10.

As shown in FIG. 3, the beltline molding 30 is comprised of: a design surface part 31 provided above the outer panel 22 for forming a vehicle outside surface; a T-shaped member 32 mounted to the design surface part 31; and a beltline strip member 33 mounted to a lower part of the design surface part 31 with a tip end extending toward the outer panel 22.

As shown in FIGS. 1 and 2, the door sash 40 comprises a metal window frame defining a generally pentagonal shape together with the beltline molding, and is comprised of: a front part sash 41 positioned forwardly of the movable window panel 16 and extending vertically; a front upper part sash 42 extending rearward from an upper end of the front sash 41 up to an upper part of the auxiliary sash 15; a rear upper part sash 43 extending downwardly inclined fashion from a rear end of the front upper part sash 42 along an upper edge of the stationary window panel 17; and a rear part sash 44 extending downwardly frontward from a rear end of the rear upper part sash 43 and covered with a molding-equipped garnish 60.

The auxiliary sash 15 comprises a member in the form of a support post extending downward from the boundary between the front upper part sash 42 and the rear upper part sash 43. Lower end of the auxiliary sash 15 extends as far as a position where it overlaps, in a door-thickness direction, with the beltline molding 30. Namely, when the vehicle door 10 is seen from outside the vehicle, the lower end of the auxiliary sash 15 is covered with the beltline molding 30.

Panel support frame 50 is made from a raw material such as rubber and achieves sealing between the stationary window panel 17 and the door body 20. The panel support frame 50 is comprised of; a front side part 51 covered by the auxiliary sash 15 as viewed from outside the vehicle and extending vertically; an upper side part 52 extending rearward in a downwardly inclined fashion from an upper end of the front side part 51; a rear side part 53 (side part 53) extending downwardly forward from a rear end of the upper side part 52; and a lower side part 54 extending from a lower end of the rear side part 53 as far as the lower end of the front side part 51 along the beltline molding 30.

The panel support frame 50 is mounted to extend along the entire peripheral edge of the stationary window panel 17. The panel support frame that supports the stationary window panel 17 provided above the door body 20. That is, the stationary window panel 17 is provided above the door body.

Molding-equipped garnish 60 comprises a generally U-shaped exterior member which includes a resinous garnish body 70 mounted to an external side of the door sash 40 and a metallic molding mounted integrally to an external side of the garnish body 70.

Molding 80 of the molding-equipped garnish 60 mounted to provide an ornamental feature to the garnish body 70. Thus, a garnish without the molding may also be adopted in the present invention.

Figure 4:
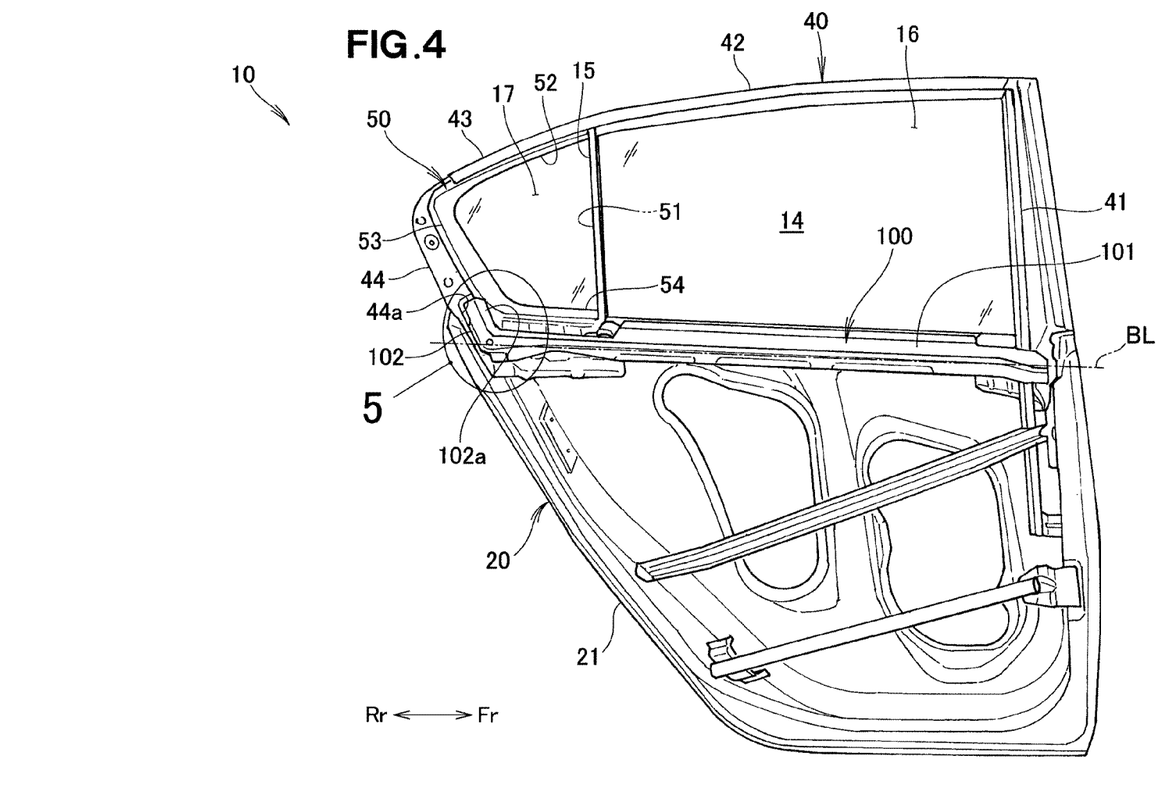
FIG. 4 is a view illustrating the vehicle door with an outer panel, a belt line molding, a garnish and a molding removed.

Referring to FIGS. 1 and 4, beltline reinforcing member 100 is provided in the vicinity of the beltline BL of the vehicle door 10 so as to extend in a front-rear direction of the vehicle door 10. The beltline reinforcing member 100 is mounted to the inner panel 21. Alternatively, the beltline reinforcing member 100 may be mounted to the outer panel 22. Selection between them may be made as needed.

The beltline reinforcing member 100 has a substantially L shape as seen from outside the vehicle and includes a reinforcing member body 101 extending along the beltline BL and an upper extension part 102 extending upwardly rearward from the rear end of the reinforcing member body 101. The upper extension part 102 extends as far as an intermediate position the rear sash 44 and lies at an obtuse angle θ relative to the reinforcing member body 101 (see FIG. 5).

The reinforcing member body 101 is covered with the outer panel 22 from outside the vehicle. By covering the reinforcing member body 101 with the outer panel 22, an external appearance of the vehicle door 10 is enhanced.

The upper extension part 102 is a member provided for holding the panel support frame rear side part 53 between it and the rear sash 44. The upper extension part 102 is covered with the molding-equipped garnish 60 from outside the vehicle. By thus covering the upper extension part 102 by the molding-equipped garnish 60, an external appearance of the vehicle door 10 is enhanced.

Figure 5:
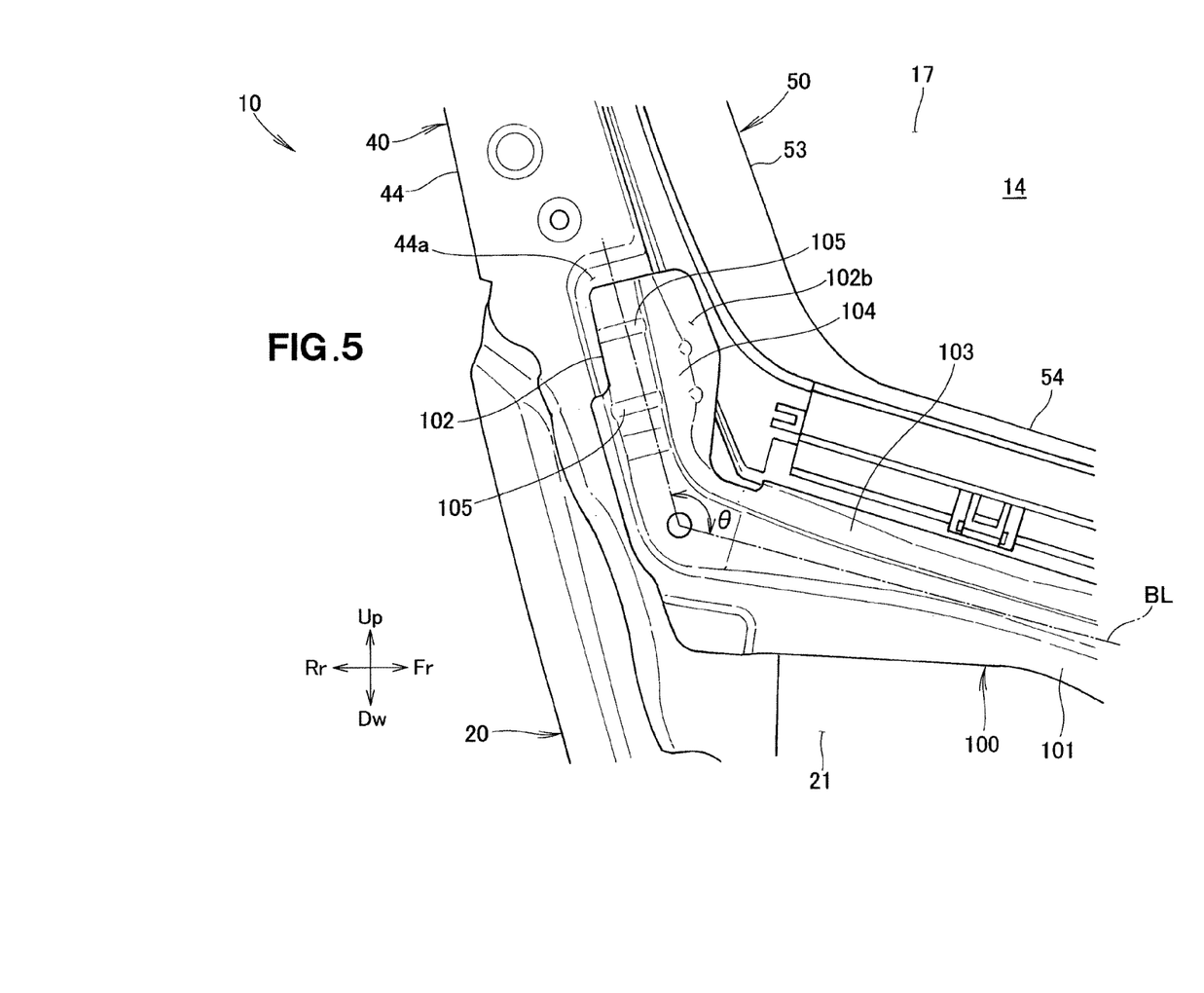
FIG. 5 is an enlarged view illustrating region 5 of FIG. 4.

As shown in FIG. 5, the beltline reinforcing member 100 is provided with a plurality of beads. Namely, the beltline reinforcing member 100 includes a first bead 103 formed in the reinforcing member body 101 so as to extend along the beltline BL, a second bead 104 formed in the upper extension part 102 so as to continuously extend from the rear end of the first bead 103, and third beads 105, 105 extending continuously downwardly from a mid-part of the second bead 104. The two third beads 105, 105 extend parallel to each other.

Owing to the continuous first and second beads 103, 104, overall rigidity of the beltline reinforcing member 100 is increased. In addition, the rigidity is further increased by the third beads 105, 105 extending from the second bead 104 in a different direction.

Figure 6:
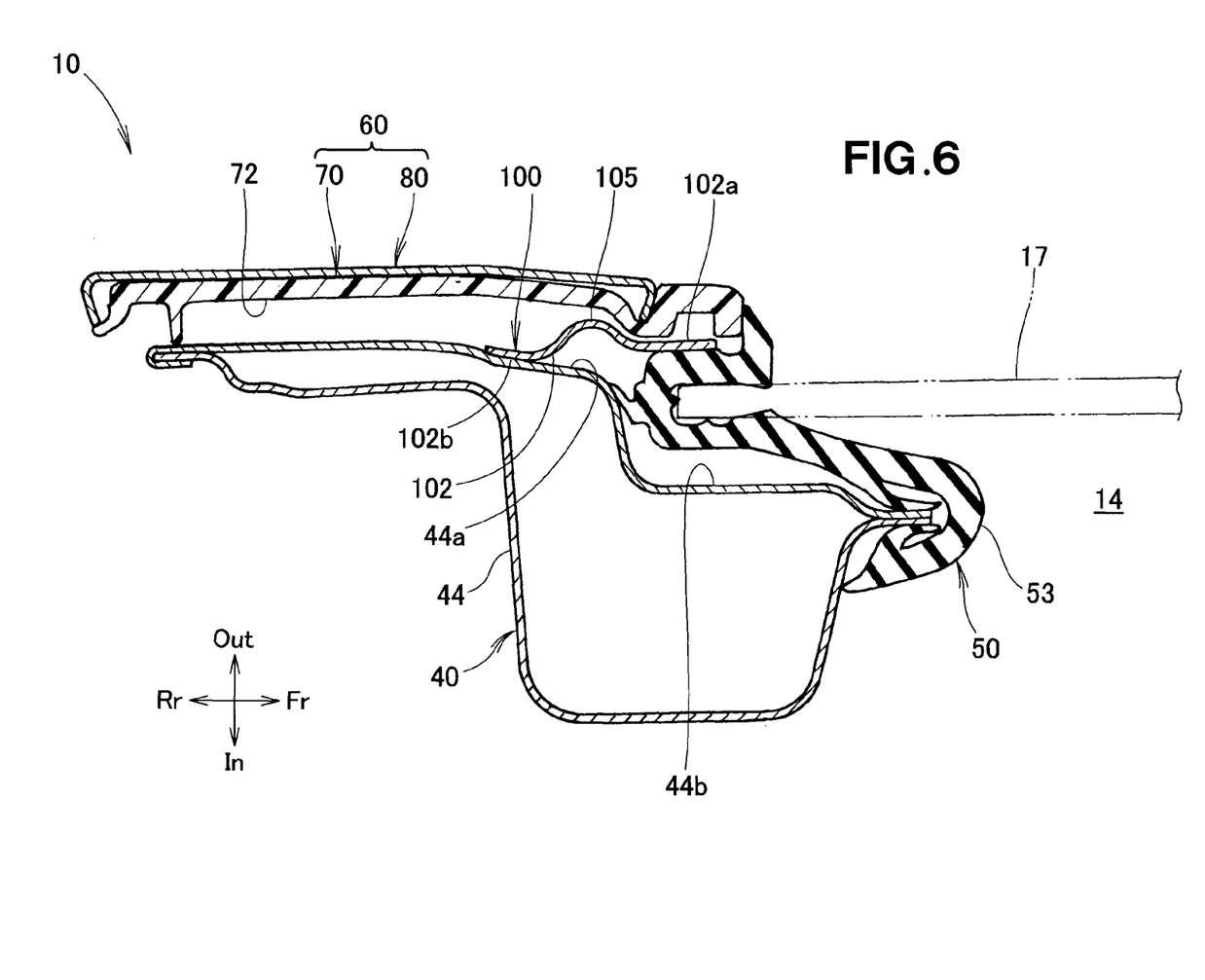
FIG. 6 is a cross-sectional view taken along line 6-6 of FIG. 2.

Referring also to FIG. 6, provided to the rear sash 44 of the door sash 40 is a recessed part 44a recessed in a direction away from a back surface 72 of the garnish body 70. Major part of the upper extension part 102 is accommodated in the recessed part 44a.

A substantially U-shaped opening is formed by a stepped part 44b of substantially L shape as viewed in cross section, provided at an end of the rear sash 44, and a distal end part 102a of the upper extension part 102. In this opening, the panel support frame 50 is engaged and supported in that state. That is, the panel support frame 50 is sandwiched by the door sash 40 and the upper extension part 102.

According to the present invention, the stationary window panel 17 is supported by use of the beltline reinforcing member 100. For supporting the stationary window panel 17, it is not necessary to make the door sash 40 complex or to increase the number of parts. By avoiding the increase in the production steps and the increase in the number of parts, it becomes possible to reduce the cost of production of the vehicle door 10 and to make the vehicle door 10 light in weight.

In addition, the upper extension part 102 extends from the upper edge of the door body 20 along the door sash 40. Owing to this, when an external force is applied in a direction (front-back direction of the drawing sheet) to cause the door sash 40 to fall toward the door body 20, the door sash 40 can be prevented from falling by the upper extension part 102. Note also that by provision of the first to third beads 103-105, the rigidity of the door sash 40 is increased to thereby surely prevent the fall of the door sash 40.

Further, the upper extension part 102 is joined at an obtuse angle with the reinforcing member body 101. As a result, it becomes possible to allow a load inputted into the upper extension part 102 to escape toward the reinforcing member body 101. By thus releasing the load, it becomes possible to suppress loads to concentrate at the boundary between the upper extension part 102 and the reinforcing member body 101.

By causing the upper extension part 102 to be accommodated within the recessed part 44a, the molding-equipped garnish 60 can be positioned further closer to the door sash 40. By thus positioning the garnish 60 closer to the door sash 40, the door sash 40 can be reduced in thickness.

The third beads 105, 105 are positioned to be accommodated with the recessed part 44a. By forming the third beads 105, 105 at such a position, the upper extension part 102 can be positioned closely to the door sash 40 even when the beads are formed in the upper extension pat 102. Positioning of the upper extension part 102 closely to the door sash 40 enables reduction in thickness of the door sash 40.

Figure 7:
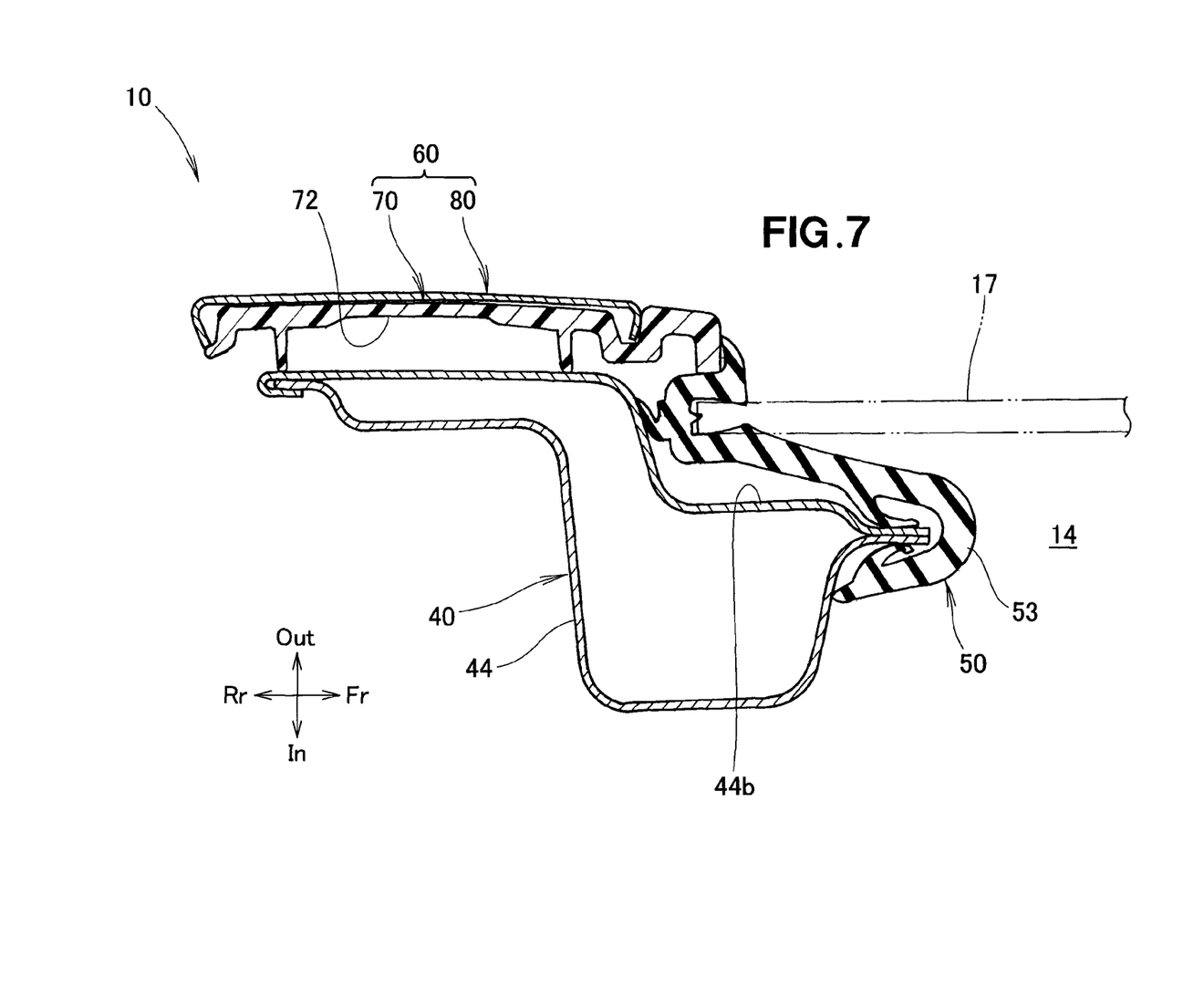
FIG. 7 is a cross-sectional view taken along line 7-7 of FIG. 2.

As shown in FIG. 7, in the region upward of the upper extension part 102 (FIG. 6) where the upper extension part is not provided, the garnish body 70 is held in contact with the panel support frame 50. By this contact arrangement, the movement of the panel support frame 50 in a panel thickness direction can be prevented. While reducing the length of the upper extension part 102, support of the panel support frame as a whole is enabled.

Referring also to FIG. 4, the length of that part of the rear sash 44 which is supported by the upper extension part 102 is less than half of the rear sash 44. In other words, the part with which the molding-equipped garnish 60 is held in contact is longer. While supporting the panel support frame 50 by the upper extension part 102, the part where the upper extension part 102 is provided is shortened and the part with which the molding-equipped part is held in contact is lengthened. By lengthening the resinous garnish body 70, it becomes possible to render the vehicle door 10 light in weight.

Figure 8:
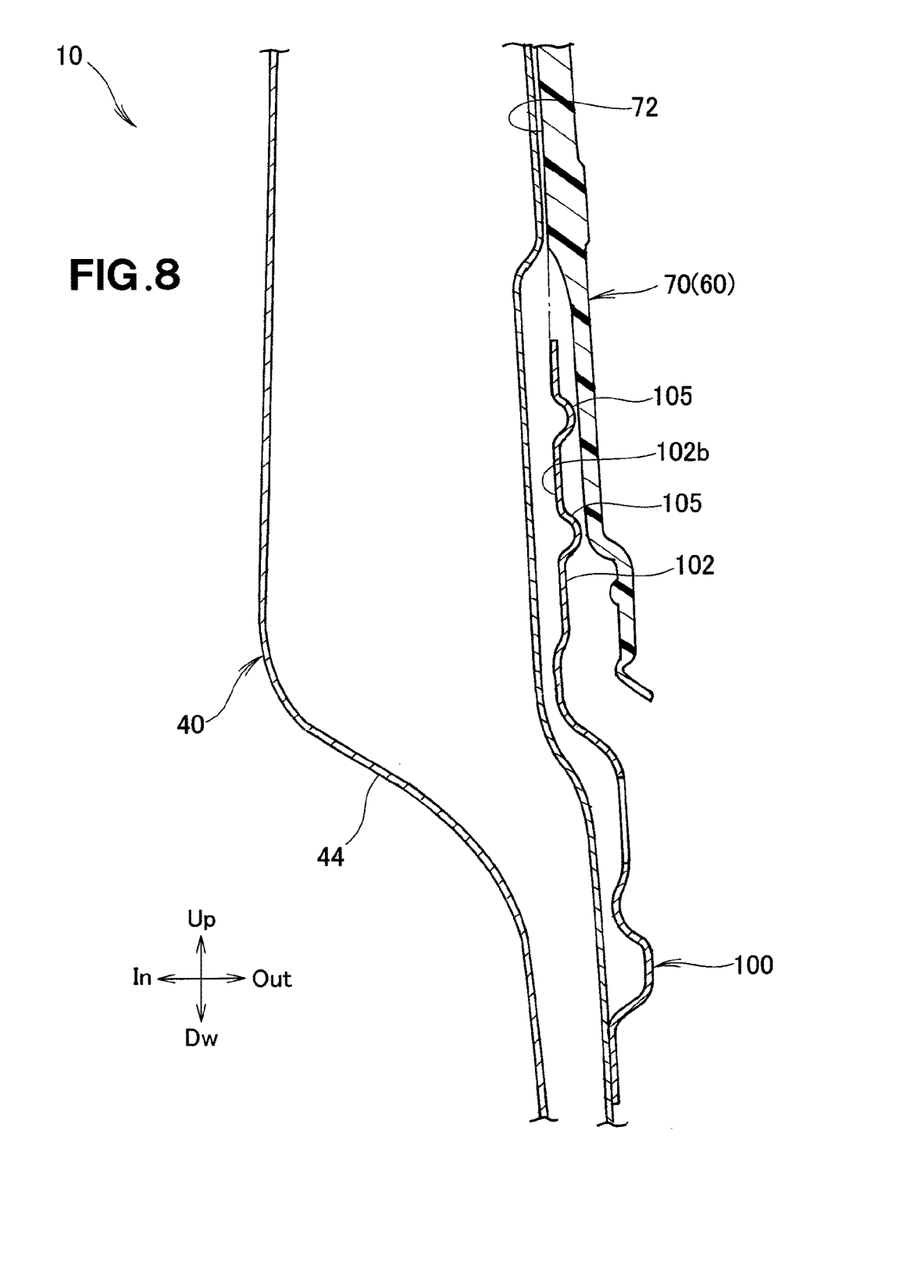
FIG. 8 is a cross-sectional view taken along line 8-8 of FIG. 2.

As shown in FIG. 8, the back surface 102b of the upper extension part 102 flush with the back surface 72 of the garnish body 70. That is, of the upper extension part 102, the surface 102b opposed to the panel support frame is flush with that surface 72 of the molding-equipped garnish 60 which is opposed to the panel support frame.

When those surfaces 72, 102b are assumed to have unevenness, it becomes necessary to shape the panel support frame so as to mitigate or cope with the unevenness. In accordance with the present invention, with the surfaces 72, 102b rendered flush with each other, it is not necessary to alter the configuration of the panel support frame. As a result, the panel support frame is rendered simple in configuration. The panel support frame rendered simple in configuration can be manufactured easily, with the result that the vehicle door 10 can be manufactured at a reduced cost.

Although the vehicle door according to the present invention has thus far been explained as being applied to a vehicle rear right side door, it may also be applied to a vehicle rear left side door or other like doors.

It should also be noted that although the vehicle door according to the present invention has thus far been explained in relation to a swing-type door, the invention should not be construed as being limited thereto as it may also be applied to a slide-type door and other like doors.

| Reference Signs List |
|---|
| 10 . . . vehicle door;  14 . . . window opening; |
| 17 . . . stationary window panel (window panel);  20 . . . door body; |
| 21 . . . inner panel;  22 . . . outer panel;  40 . . . door sash; |
| 44a . . . recessed part;  50 . . . panel support frame; |
| 60 . . . molding-equipped garnish (garnish); |
| 72 . . . back surface (opposed-to-frame surface); |
| 100 . . . beltline reinforcing member;  102 . . . upper extension part; |
| 102b . . . back surface (opposed-to-frame surface);  103 . . . first bead; |
| 104 . . . second bead |

The invention claimed is:

1. A vehicle door comprising:
a door body having an inner panel and an outer panel;
a door sash mounted to an upper part of the door body;
a window opening defined by the door sash and an upper edge of the door body;
a window panel blocking at least part of the window opening;
a panel support frame supporting at least part of a peripheral edge of the window panel; and
a beltline reinforcing member mounted to one of the inner panel and the outer panel so as to extend along the upper edge of the door body,
wherein the beltline reinforcing member includes an upper extension part extending along the door sash further upward than the upper edge of the door body, and the panel support frame is sandwiched between the door sash and the upper extension part,
wherein the vehicle door further comprises a garnish covering an external surface of the door sash and is formed by a member separate from the panel support frame, and the upper extension part has an external surface covered by the garnish, and
wherein the upper extension part has an upper end positioned at a vertically intermediate position of the door sash relative to a height dimension of the door sash, and the garnish is held in direct contact with the panel support frame at a portion of the panel support frame above the upper end of the upper extension part.

2. The vehicle door of claim 1, wherein the door sash has a recessed part in the external surface of the door sash covered with the garnish, the recessed part being recessed in a direction away from a back surface of the garnish, and the upper extension part is provided in the recessed part.

3. The vehicle door of claim 2, wherein the beltline reinforcing member has a first bead extending along the upper edge of the door body, the upper extension part has a second bead extending along the door sash, the second bead extending continuously from the first bead.

4. The vehicle door of claim 2, wherein the upper extension part has a back surface opposed to the panel support frame, and the back surface of the upper extension part is positioned flush with the back surface of the garnish.

5. The vehicle door of claim 1, wherein the upper extension part has a back surface opposed to the panel support frame, and the back surface of the upper extension part is positioned flush with the back surface of the garnish.

6. The vehicle door of claim 5, wherein the beltline reinforcing member has a first bead extending along the upper edge of the door body, the upper extension part has a second bead extending along the door sash, the second bead extending continuously from the first bead.

7. The vehicle door of claim 1, wherein the beltline reinforcing member has a first bead extending along the upper edge of the door body, the upper extension part has a second bead extending along the door sash, the second bead extending continuously from the first bead.

* * * * *